UNITED STATES PATENT OFFICE.

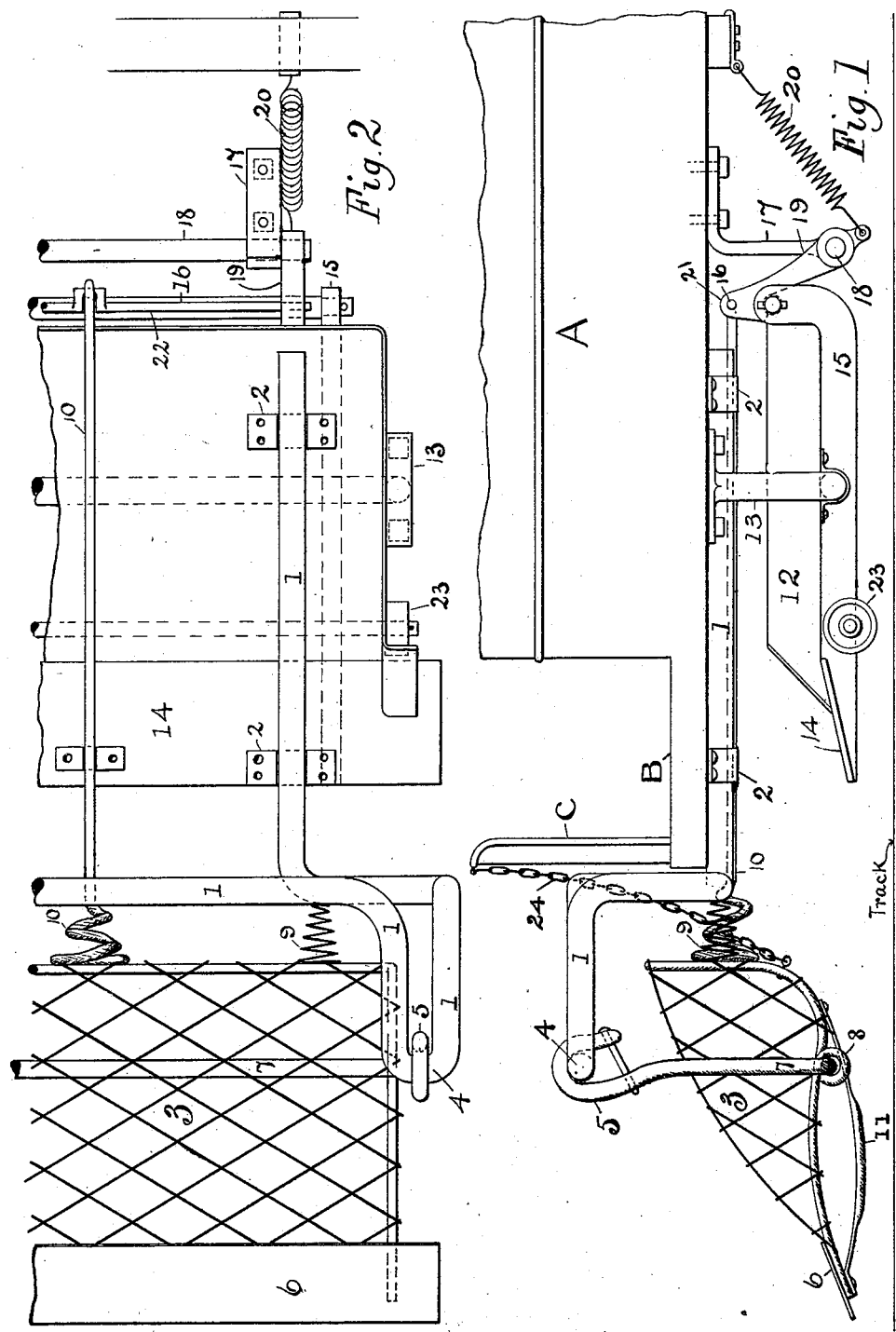

HENRY WILSON, OF PHILADELPHIA, PENNSYLVANIA.

FENDER FOR STREET-RAILWAY CARS.

SPECIFICATION forming part of Letters Patent No. 548,339, dated October 22, 1895.

Application filed July 11, 1895. Serial No. 555,595. (No model.)

*To all whom it may concern:*

Be it known that I, HENRY WILSON, a citizen of the United States, residing at Philadelphia, in the county of Philadelphia and State of Pennsylvania, have invented certain new and useful Improvements in Fenders for Street-Railway Cars; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in appliances for the protection of pedestrians in crowded city streets, where since the introduction of self-propelled cars the danger from collisions is very much increased. Formerly the horses in front of the car, by providing more distance and time, prevented the car-wheels from reaching the person, and in order to approach such a condition as nearly as possible I attach one fender in front of and projecting from the car, the other and secondary fender being suspended under the car and made to come into use by means from the forward fender in order to afford additional protection in case the forward fender fails of its purpose. I attain these objects by the mechanism illustrated in the following drawings, in which—

Figure 1 is an elevation of my fenders. Fig. 2 is a plan view of one-half of each fender, each side being alike and the car body and platform being removed.

Similar references refer to similar parts throughout the views.

A is the car-body, to which the usual platform B and dasher C are attached, as is usual in such constructions. Passing under the platform and car-body I secure a double frame 1 by clamps 2 or equivalent means, into which it can be inserted or removed at pleasure. This frame 1 projects beyond and turns up in front of the dasher C toward each side of the car-body A; then is bent forward and outward, where it is again bent inward toward the center of the car from each side; then doubled back upon itself and again approaches the dasher C, being bent again so as to lie parallel to the dasher C and away from the fender, thus affording a means for suspending my scoop-fender 3, which is carried by the loops 4, formed in the frame 1, the suspension being preferably by means of two hooks 5; but an equivalent means of suspension will do and will be described farther on.

My fender 3 is preferably made of interlaced or interwoven material—such as wire, rope, or netting—having numerous interstices. Its general shape is such as to round up from its front edge to its suspension-frame 7, around which it circles, forming a loop 8; or it may be attached by other means. Then it is hollowed toward the track, forming a pocket, and afterward rounds upward and passes part way up and parallel to the fender. Its forward edge is covered by a flap 6, of leather or similar flexible and soft material, inclined toward the track and touching it when in active position, thus preventing any object passing beneath it or being injured by coming in contact with it, and being thin it affords no obstruction to any object passing over it and into the fender. This fender has attached to and under it a suspension-frame 7, which it embraces, thus permitting a seesaw motion of the fender, the frame afterward extending upward, where it terminates, preferably, in hooks 5, which engage the loops 4 and allow also a swinging motion of the fender 3. At the back of this fender 3 are springs 9 on each side, secured on one end to the fender 3 and at the other end to the frame 1. Against the center of the fender is a spring-rod 10, which will hereinafter be described. On each side of the fender 3, underneath and preferably over each rail, are springs 11, which prevent the body of the fender from coming in contact with the rail when it swings down in active operation or its being crowded below its point of usefulness, or where it can be damaged.

Underneath the car, but in front of the wheels, is a back fender 12, pivotally suspended near the center of its length by hangers 13, suitably attached to the under part of the car. This fender 12 can be made of wires or ropes, interlaced netting, or solid material, as desired, the sides and back end being inclosed and the front end open, where an inclined apron 14 is attached. This apron 14 is of similar soft yielding material to that upon the front fender 3 and stands at an angle to the track, and being thin and flexible offers no resistance to objects entering this scoop-fender 12. Under the fender 12, on each side and attached thereto, are frames 15. Each frame supports the apron 14 and turns up at the back of the fender, where at its upper end it is connected through a proper opening to the opposite frame 15 by a rod 16.

Attached under the car-body A on each side, back of the fender 12, are hangers 17, reaching downward and carrying a shaft 18, which unites them and serves as a bearing for two hooked latches 19, one on either side, which engage the rod 16 and prevent the front end of the fender 12 from tilting down upon the rail when not required. These hooked latches have attached springs 20 at their lower end to insure their remaining in locked position and their returning to their normal position when the force which displaced them has been expended. At their upper ends 21 they receive a rod 22, which passes through each hooked latch 19 and at its center is embraced by the spring-rod 10, which goes forward under the center of the car and being enlarged into spring form for contact at its forward end abuts the fender 3. The fender 12 has at each side forward a wheel 23 attached to it, so as to run upon the rails when the fender is in its operative position.

The operation of my fender system is as follows: Whenever a person or an obstruction upon the track is struck, the fender 3 tilts down to the track. It also has a backward movement as it swings from the loops 4, carrying the flap 6 down to the road and closing any opening under the front of the fender, thus affording an easy incline for the entrance of the obstacle struck. The backward action compresses the springs 9, whose function is to hold the fender to its normal position, and the spring-rod 10 is then operated, which by its connection 22 unlatches the hooks 19, when the back fender tilts and its front end drops by gravity into its working position, so that if an object escapes the front fender it will be scooped up by the back one. When the front fender is relieved of pressure by the removal of the obstacle, the springs 9 automatically return it to its normal position and permit the back fender to be lifted to its normal position and latched. A chain or rope 24 extends from the fender 3 to the top of the dasher C to enable the motorman to operate the fenders by a pull, if he desires.

I am aware that double fenders, one front and one back, have heretofore been used. I am also aware that the back fender-scoop has been made hinged to drop in front. Therefore I do not claim the use of double fenders or dropping fenders, broadly; but

I claim—

1. In a street car fender, a car body, a removable frame attached to the car underneath, projecting in front thereof, and turned up so as to form a point of suspension, suspension devices for a pendulous and tilting fender carried upon said devices, substantially as described.

2. In a street car fender, a car body, an attached frame to form a point of suspension for a fender carried therefrom having radial movement from the point of pendulous suspension, and tilting movement from its suspending frame, substantially as specified.

3. In a car fender looped around its means of suspension, a frame work for the fender, a flexible flap or apron on the edge thereof, and means for pendulously suspending and tilting the fender substantially as specified.

4. In a street car fender, a framework therefor forming a point of pendulous suspension, a covering and loop connection for the frame to its means of suspension, a flat, flexible flap upon the front thereof and springs upon the bottom or under side, substantially as described.

5. In a street car fender having radial and tilting suspension, a framework therefor of curved, inclined and hollowed bottom construction, a connecting net work attached to its frame, a flat, flexible, projecting flap on the front thereof, springs arranged underneath for its support, and at its back, springs to maintain the structure in normal position when not in operation, substantially as described.

6. In a car fender, a car body, a frame to form a point of suspension, a pendulous and tilting scoop carried upon said devices, an abutting spring rod under the car, and means to unlatch a back tilting fender, substantially as described.

7. In a street car fender, a front fender, pendulously and tiltingly suspended, a back fender suspended for tilting movement under the car, held in inoperative position by hooked latches, and means for simultaneous operation of the back, from the front, fender, substantially as described.

8. In a street car fender, a car body, a frame attached under the car, to centrally carry a scoop fender supported thereon for tilting motion, a flexible flap upon its front or open end, a frame under and upturned behind the scoop, a rod connecting the upturned ends of the frame, wheels for track contact, and hooked latches and springs to hold the scoop from the rail when not in operation, substantially as specified.

9. In a street car fender, a car body, hangers attached to and suspended therefrom, a shaft carried thereby, hooked latches thereon, springs to hold the latches in position, and means from the front fender for unlatching the hooks from a back fender suspended to tilt its front end down and its back end up when the hooks are released, substantially as specified.

10. In a street car fender, a car body, a fender in front thereof having pendulum and tilting movement from a point of suspension, a fender suspended under the car for tilting movement, latches to secure it inoperatively, and means to unhook the latches, by the pendulous movement of the front fender, to allow the back fender to tilt and drop its front end to the track, substantially as specified.

11. In a street car fender, a car body, a front scoop fender having a point of suspension for pendulum and seesaw motion, and connections to operate a back fender carried upon a central horizontal shaft suspended under the car so as to drop the front end of the back fender to the rail by its own gravity when unlatched, substantially as described.

12. In street car fenders, a car body, a removable suspension frame attached thereunder and projecting upwardly in front thereof, a suspension frame swingingly secured thereto, a fender tiltingly attached thereto at about its center so as to tilt toward the track when meeting an obstruction, and also to swing back toward the car, netting thereon, a flat flexible flap secured to the front thereof, springs at its back to secure its normal position upon release from loaded pressure, springs on the bottom for track contact, an abutting spring rod against the fender and passing back under the car in combination with a back fender under the car, tiltingly suspended therefrom at about its center, a flat flexible flap on its front end, wheels for track contact, frames under the fender and at its back end, a rod connecting the upper back end, a shaft suspended from the car back of the fender, a shaft therein, hooked latches thereon, springs attached to the latches to keep them engaged and attachments from the hooked latches to the spring rod from the front fender for simultaneous action of both the front and back fenders when the front fender meets an obstruction, substantially as described.

In testimony whereof I affix my signature in presence of two witnesses.

HENRY WILSON.

Witnesses:
GEO. W. REED,
R. C. WRIGHT.